UNITED STATES PATENT OFFICE.

FREDERICK F. HUNT, OF NEW BRIGHTON, NEW YORK.

GREEN PIGMENT AND PROCESS OF MAKING THE SAME.

932,864.  Specification of Letters Patent.  Patented Aug. 31, 1909.

No Drawing.  Application filed July 29, 1907. Serial No. 386,089.

*To all whom it may concern:*

Be it known that I, FREDERICK F. HUNT, a subject of the King of Great Britain, residing at New Brighton, Richmond county, New York, have invented certain new and useful Improvements in Green Pigments and Processes of Making the Same; and I do hereby declare the following to be a full, clear, and exact description of the same, such as will enable others skilled in the art to which it appertains to make and use the same.

This invention relates to green pigments and processes of making the same; and comprises a green pigment containing ferrocyanogen together with ferric iron in amount greater than that equivalent to such ferrocyanogen and sufficient to furnish a substantial excess of basic ferric iron; and a process of making pigments which consists in treating a ferric composition of acid reaction but containing an excess of combined ferric iron and of a basic nature, chemically considered with ferrocyanid solution in amount less than that necessary to be equivalent to such ferric iron; all as more fully hereinafter set forth and as claimed.

As is well known, addition of a ferrocyanid solution to a solution containing a ferric salt and free acid, that is, acid in excess of the amount chemically equivalent to the ferric iron, results in the formation of a deep blue precipitate of ferric ferrocyanid, or "Prussian blue". The reaction does not take place in alkaline solutions, alkaline-reacting substances either decomposing the blue precipitate or preventing its formation. Such substances applied to the blue once formed either decompose it or give it a faded and undesirable tint. For these reasons in practice it is the custom to perform the reaction in freely acid solutions; and an excess of ferrocyanid is also generally employed. I have, however, found that if I perform the precipitation under certain particular conditions, in lieu of obtaining the well-known blue I form new and useful green pigments. These conditions include the use of amounts of ferric iron relatively large as compared with the amount of ferrocyanid, such ferric iron being in a readily reactive form and the employment of acid in amounts which while sufficient to combine with the base of the ferrocyanid shall not be large enough to be equivalent to all the ferric iron present. If a limited amount of a soluble ferrocyanid be added to a liquid containing a mineral acid in amount equivalent to or rather more than equivalent to such ferrocyanid, and also containing readily reactive ferric iron, either in solution or suspension, or both, in amount greater than that equivalent to the ferrocyanid and to the acid, a green precipitate results. The particular hue resulting depends upon the relative ratios of the acid, the ferrocyanid and the ferric iron. Other conditions being equal, less acid and ferrocyanid will give lighter greens while increasing the ratio of these bodies to that of the ferric iron results in darker compositions. The hues generally have more or less of an olive cast. If a part of the ferric iron be in suspension as hydrate, as is frequently convenient, the color of the particular hydrate employed, whether yellowish or brownish, has some influence on the color of the resulting pigments; some, in such cases, being generally left mechanically intermingled.

All the ferric iron may be in solution in the acid employed, forming what is frequently known as a "basic solution", or one in which the ferric iron is greater in amount than chemically corresponds to the acid present. Such a solution is, however, acid in reaction to chemical indicators and is adapted for the performance of my process, addition of ferrocyanid giving a green precipitate of a hue depending upon the proportions of the materials present. A solution of this character may be formed, for instance, by adding a small amount of a base, such as ammonia or soda, to a solution of ferric chlorid, or by treating freshly precipitated ferric hydroxid by a ferric chlorid solution or by a limited amount of acid. Addition of a little alum solution to these solutions sometimes improves the color of the pigment produced and facilitates the production.

While I believe the composition produced in the manner described is in the nature of a basic ferrocyanid, I do not commit myself to any statement of theory in this regard. A more economical and ready method of making the pigment, however, is to suspend freshly prepared hydrated ferric oxid in water or a saline solution, add the necessary amount of an acid, such as hydrochloric acid and then the ferrocyanid, preferably stirring vigorously. The ferric hydrate should be in a readily reactive condition and is, as stated, preferably freshly prepared as it then reacts more readily and is also in a physical condition permitting an almost molecular intermingling of such as does not chemically react in the precipitation with the pigment formed. The particular state of hydration of ferric oxid has an influence upon its color, and this color in turn, when such excess of hydrate is mechanically intermingled with the green pigment, of course modifies its hue.

In the mixture of ferric hydrate and acid, the acid probably forms supersaturated and chemically basic, acid-reacting solutions to an extent depending upon the nature of the acid and the nature of the ferric hydrates. Such supersaturated solutions are completely precipitated by ferrocyanid, giving green precipitates containing basic ferric iron in a hydrated condition. With this precipitate mingles, as stated, any excess of ferric hydrate which may be and usually is present, the ferrocyanid and acid being customarily employed in less than equivalent amounts, so that some ferric hydrate may not, and probably does not, go into solution during the reaction, thereby adding to the amount of basic hydrated ferric iron in the precipitate. The exact nature of the reaction and the exact composition of the resulting pigment will, however, of course, vary with the conditions and these conditions may be varied according to the character of the green pigment sought. Wide variations of conditions, resulting in a wide range of products, are possible within the purview of my invention since there is a market demand for many shades of greens. The acid employed may be any convenient strong acid. Sulfuric and hydrochloric are especially suitable. Any soluble ferrocyanid, such as potassium ferrocyanid, calcium ferrocyanid or sodium ferrocyanid may be employed.

The ferric hydrate may be prepared by any convenient process and may be any of the various reactive hydrates of $Fe_2O_3$. It should be substantially free of ferrous iron. One simple, cheap and ready method of preparing a suitable ferric hydrate is to oxidize iron turnings electrolytically, forming ferrous hydrate and then convert this into the ferric hydrate by blowing with air. Still another is to precipitate ferrous salts with a base, which may be an alkaline earth, such as lime, and oxidize the ferrous hydrate with air or other oxidants. When ferrous sulfate is precipitated with lime, the calcium sulfate formed remains in the hydrate and may form a component of the green later produced, giving it lighter shades. A little alum or sulfate of aluminum in the solution may also be used in producing lighter shades. A dark olive green may be obtained by suspending the ferric hydrates from 1,000 grams of iron in water, adding 67.5 grams of sulfuric acid, thoroughly mixing and then adding a solution of 135 grams of potassium ferrocyanid. If a less amount of acid and of ferrocyanid be used, the darkness of hue will be diminished and a lighter green will be obtained. A lighter hue will also be obtained if the ferric hydrate has been prepared by precipitating ferrous sulfate with lime and oxidizing, since it will contain molecularly intermingled, very finely subdivided white calcium sulfate. The pigment obtained is a green body and represents a ferric ferrocyanid having an excess of ferric oxid or hydrate chemically combined or mechanically intermingled therewith as a basic component, or, very probably, both, in many instances at least. To such an extent as the mixture is mechanical, it is probably almost molecular in its nature, at least to a large degree, the floccules of freshly formed ferric hydrates being very "tender" and breaking up readily in the stirring incident to the process, so that the product is homogeneous in color even when reduced to an impalpable powder. The pigment is permanent in air, usually has a color varying between a light olive green and a dark olive green, has great covering power and mingles readily with the usual paint vehicles. It may be conveniently and advantageously used in connection with linseed oil, tung or wood oil and like vehicles to form cheap, decorative paints. Being formed from solutions or from artificially prepared hydrated iron oxid, the pigment is free from gritty matter and may be readily reduced to an impalpable powder.

What I claim is:—

1. As a pigment, a green homogeneous composition comprising combined ferrocyanogen and ferric iron substantially free of ferrous iron, the ferrocyanogen and ferric iron having been co-precipitated and the ferric iron existing in sufficient excess of the amount equivalent to the ferrocyanogen to render the composition chemically basic, said excess being in a basic hydrated form, and said pigment having a dark green color, being homogeneous in color and being free of gritty matter.

2. The process of preparing a pigment which consists in forming an acid reacting liquid containing an excess of ferric iron in a highly reactive hydrated state, the acid in said liquid being less than is chemically equivalent to said ferric iron and said ferric iron being substantially free of ferrous iron, and in adding a ferrocyanid in amount less than is chemically equivalent to said ferric iron.

3. The process of preparing a pigment which consists in suspending freshly prepared ferric hydrate in a liquid, adding an amount of acid less than is equivalent to said hydrate and adding a ferrocyanid, also in amount less than is equivalent to said hydrate.

4. The process of preparing a pigment which consists in suspending freshly prepared ferric hydrate in a liquid, adding an acid in amount less than that equivalent to said hydrate and adding a ferrocyanid in amount equivalent to said acid.

5. The process of preparing a pigment which comprises oxidizing iron to form ferric hydrate, suspending the ferric hydrate in water, adding an acid in amount less than equivalent to such ferric hydrate and precipitating with a ferrocyanid, also in amount less than equivalent to such hydrate.

In testimony whereof I affix my signature in the presence of two witnesses.

FREDERICK F. HUNT.

Witnesses:
  H. M. MARBLE,
  BLANCHE CARSON.